United States Patent [19]

Kakida et al.

[11] Patent Number: 5,282,524
[45] Date of Patent: Feb. 1, 1994

[54] METHOD AND DEVICE FOR POSITIONING A BODY

[75] Inventors: Takuya Kakida; Shoiti Okada; Akira Mikami, all of Kurashiki; Yuji Watanabe, Kojima, all of Japan

[73] Assignee: Mitsubishi Jidosha Kogyo Kabushiki Kaisha, Tokyo, Japan

[21] Appl. No.: 953,917

[22] Filed: Sep. 30, 1992

[30] Foreign Application Priority Data

Sep. 30, 1991 [JP] Japan .............................. 3-079302[U]
Sep. 30, 1991 [JP] Japan .............................. 3-079303[U]

[51] Int. Cl.⁵ ............................................ B65G 47/22
[52] U.S. Cl. ............................. 198/345.1; 198/345.3
[58] Field of Search ............... 198/345.1, 345.2, 345.3, 198/374, 375, 376

[56] References Cited

U.S. PATENT DOCUMENTS

| | | | |
|---|---|---|---|
| 4,516,318 | 5/1985 | Kirschenman | 198/345.3 X |
| 4,674,620 | 6/1987 | Inoue | 198/345.3 |
| 4,751,995 | 6/1988 | Naruse et al. | 198/345.3 |
| 4,898,268 | 2/1990 | Kamioka et al. | 198/345.1 |

FOREIGN PATENT DOCUMENTS

| | | | |
|---|---|---|---|
| 0115515 | 9/1980 | Japan | 198/345.1 |
| 0114917 | 6/1986 | Japan | 198/345.1 |
| 0226415 | 10/1986 | Japan | 198/345.1 |
| 0121127 | 6/1987 | Japan | 198/345.1 |
| 0012517 | 1/1988 | Japan | 198/345.3 |

*Primary Examiner*—James R. Bidwell

[57] ABSTRACT

This invention is directed to a method and a device for positioning a body transported on a conveyer as a transporting path at a longitudinal predetermined positioned or a lateral predetermined position on the path. The method positively positions the body at a plurality of positions by way of selectively shifting and holding a longitudinal positioning member or a lateral position restricting plate, which slideably contacts with a vertical projecting wall of the body, at the longitudinal predetermined position depending on the configuration of each body, prior to the arrival of the body at either predetermined position on the path. The device comprises a structure mechanism including longitudinal positioning apparatus which enables selectively shifting and holding the longitudinal position of the body at a plurality of positions in contact with a tip reference portion of the body transported on the conveyor; lateral positioning apparatus which enables selectively shifting and holding the lateral position of the body at a plurality of left and right locations using the lateral position restricting plate slidable in contact with the vertical projecting wall of the body; and control apparatus for supplying a shifting signal to such positioning apparatuses on setting thereof, the control apparatus being implemented so that the body is selectively shifted to and controlled at either predetermined position depending on the configuration of each body.

11 Claims, 10 Drawing Sheets

METHOD AND DEVICE FOR POSITIONING A BODY

BACKGROUND ART

This invention relates to a method and a device for positioning a car body at a predetermined position on a transporting path in a manufacturing line.

Conventionally, a manufacturing line for a car body comprises a pressing station for pressing a steel plate into predetermined shape, a weld assembling station for subsequently joining the pressed parts, and a painting station for painting the assembled body. In particular, in the weld assembling station, a plurality of pressed parts are successively selected and are joined together in a predetermined order. The selected parts are transported to a predetermined joining station, where they are automatically joined using a predetermined weld processing machine. In such a manufacturing line, the body in the course of the assembling cycle is transferred by a conveyer to the subsequent weld processing station after completion of one welding process.

In general, for the aforementioned body manufacturing line, a shuttle conveyer is preferably applied which can rapidly transport the body in the course of the assembling cycle from a first conveyer to a subsequent weld processing station with high positioning accuracy.

The shuttle conveyer which acts as a second conveyer is widely used because it enables the implementation, at a relatively fast transportation speed, of a cycle for lifting, transporting, lowering and returning to an initial position with no parts thereon, a shuttle extending along the transporting direction. In the case where the body is transported by using this shuttle conveyer, a body which has already arrived at one transfer position is first positioned at a predetermined position. Subsequently, a projection on an upper surface of the shuttle is inserted into a predetermined engaging hole provided on a lower wall of the body to lift up the body. Thereafter, the shuttle is transported at high speed for one transportation distance. The shuttle is then lowered and transported to an initial transfer position with no parts thereon. It is noted that the positioning can be readily achieved, as the shuttle is lowered, with the engaging hole or the like disposed at a predetermined position on the lower wall of the body being engaged with an engaging member for use at restricting the position in the subsequent station, e.g., the welding station.

As mentioned above, when the body is transferred from the first conveyer to the second conveyer, it is necessary to accurately position the body at the transfer position.

Thus, in the transporting path for transporting a body using the conveyer, the body must be positioned depending on the necessity for an exchange on the transporting path. Accordingly, a positioning device is disposed on the transporting path of this kind.

When only one type of body is transported along the body manufacturing line, the lateral position can be restricted by using lateral position restricting guides which are securely arranged on each side of the transporting path. Further, the longitudinal positioning of the body can be carried out by means of a stopper member secured at the transfer position on the transporting path.

Problems to be solved by the Invention

On the other hand, when a plurality of bodies with different configurations are successively transported along the transporting path, several problems remain even though a plurality of longitudinal predetermined positions and a plurality of lateral predetermined position are determined depending on the body type at the transfer position on the transporting path. More particularly, it is not properly known how to select a desired set position among this plurality of predetermined positions and how to operate without any problems.

In addition, an engaging hole is formed in each body for engaging with the engaging projection of the shuttle. This engaging hole is, however, disposed at a different position for every body. Therefore, a fixed lateral position restricting guide and a stopper member are disadvantageous in that each engaging hole of a plurality of bodies cannot be positioned to engage with the engaging projection of the shuttle using such a guide or member.

Further, even when a plurality of lateral position restricting guides and stopper members are arranged depending on the body type at the transfer position on the transporting path for dealing with a plurality of bodies successively transported along the transporting path, the lateral position restricting guides and the stopper members other than the one selectively used should be temporarily drawn away from the transporting path. A selective positioning of the body with high accuracy cannot be achieved with such a complicated device, which has another disadvantage of making it impossible to simplify the device.

SUMMARY OF THE INVENTION

An object of the present invention is to provide a method for positioning a body which enables selection of a desired set position among a plurality of longitudinal predetermined positions and lateral predetermined positions on a transporting path for transporting the body and enables positioning the body at the selected position with high accuracy. Further, another object of the present invention is to provide a device for positioning a body which enables positive positioning of the body transported along the transporting path at a set position selected from a plurality of longitudinal predetermined positions and lateral predetermined positions depending on the body type, without complicating the device itself.

A method for positioning a body according to the present invention is characterized in that a longitudinal predetermined position is provided at a transfer position where the body transported on a first conveyer is transferred to a subsequent second conveyer, and a device is used for positioning the body at one of longitudinal predetermined positions by means of a longitudinal positioning member in contact with a tip reference portion of the body, whereby the longitudinal positioning member is selectively moved and held at one longitudinal predetermined position depending on the type of the body, prior to arrival of the body at the transfer position.

In particular, as the method for positioning the body, a lateral predetermined position may be provided at the transfer position, and a device may be used for positioning the body by means of a lateral positioning member in contact with a vertical projecting wall, whereby the lateral positioning member is selectively moved and held at one lateral predetermined position depending on the type of the body prior to arrival of the body, at the transfer position.

Particularly, as the method for positioning the body, the longitudinal predetermined position and the lateral predetermined position may be provided at the transfer position, and a device may be used for positioning the body by means of a longitudinal positioning member in contact with a tip reference portion of the body and a lateral positioning member in contact with the vertical projecting wall, respectively, whereby the longitudinal predetermined position and the lateral predetermined position are each selected depending on the body type and the longitudinal positioning member and the lateral positioning member are selectively moved and held at the respective selected position prior to arrival of the body at the transfer position.

In accordance with such a method for positioning the body, the longitudinal positioning member and the lateral positioning member are selectively held at the longitudinal predetermined position and the lateral predetermined position, respectively, depending on the body type. Therefore, it is possible to positively position the body at the longitudinal predetermined position or the lateral predetermined position depending on the body type by means of the longitudinal positioning member or the lateral positioning member, both of which are advancing along the transporting direction and come into contact with the tip reference portion of the body or by means of the lateral positioning member in contact with the vertical projecting wall.

Thus, the shifting operation can be positively carried out because a single longitudinal positioning member and a single lateral positioning member with no complexity of the device are selectively held at the longitudinal predetermined position and the lateral predetermined position before the body arrives at the transfer position.

On the other hand, in a device for positioning the body according to the present invention, a tip reference portion is formed on the body for longitudinal positioning of the body. The device is characterized by comprising a conveyer for use in transporting the body along the transporting path, longitudinal positioning means which enables selectively holding of the body with an engaging point at the longitudinal predetermined position, depending on the body type, in contact with the tip reference portion of the body, and control means for supplying a shift signal to the longitudinal positioning means.

Particularly, the device for positioning the body may further comprise lateral positioning means, where a vertical projecting wall is formed extending along the longitudinal direction of the body for lateral positioning of the body, which enables selectively holding of the body at the lateral position depending on the body type in contact with the vertical projecting wall of the body.

Further, the device for positioning the body may further comprise longitudinal positioning means and lateral positioning means, where the tip reference portion and a vertical projecting wall are formed for longitudinal positioning of the body and lateral positioning of the body, respectively, and which enables selectively holding of the body at the longitudinal predetermined position, with an engaging point, and the lateral predetermined position, with an engaging point, depending on the body type, in contact with the tip reference portion of the body and the vertical projecting wall of the body, respectively, and comprise control means for supplying a shift signal to the longitudinal positioning means and the lateral positioning means.

In the device for positioning the body as mentioned above, the control means selects the longitudinal predetermined position or the lateral predetermined position depending on the type of the body transported along the transporting direction. The control means produces a shift signal to shift the longitudinal positioning means to the longitudinal predetermined position or to shift the lateral positioning means to the lateral predetermined position. Accordingly, it is possible to position the body at one of a plurality of longitudinal predetermined positions or lateral predetermined positions only with a single longitudinal positioning member and a single lateral positioning member. In addition, the shifting operation can be completely carried out with an improved simple device.

BEST MODE FOR CARRYING OUT THE INVENTION

An embodiment of the present invention will now be described.

Figure 1:
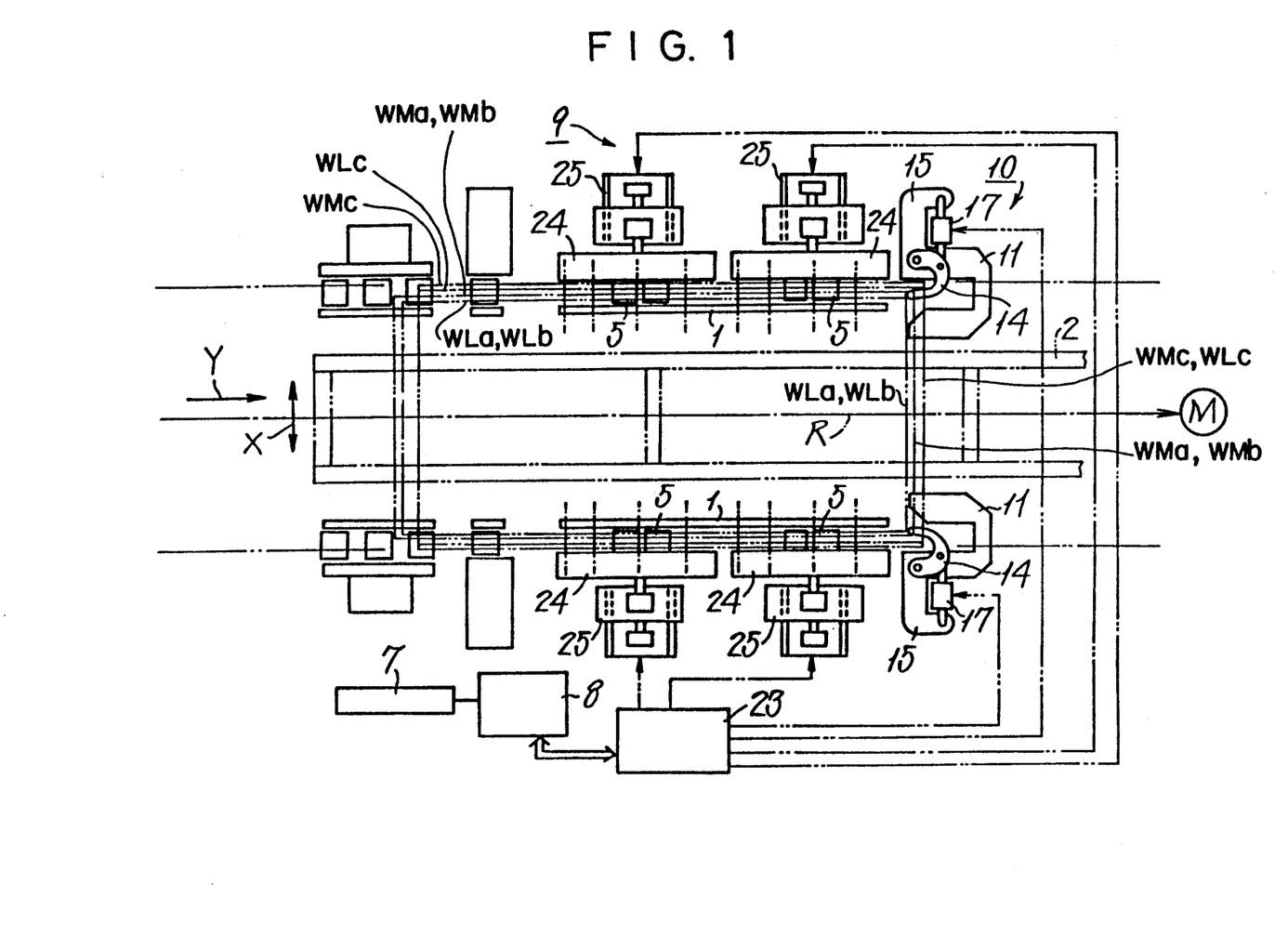
FIG. 1 is a schematic plan view of a main portion of a device for positioning the body on a transporting path according to an embodiment of the present invention.

FIG. 1 shows an embodiment of the present invention. The illustrated device for positioning the body is arranged in a part of a car manufacturing line.

The devices for positioning the body according to this embodiment are oppositely disposed on both sides of a transporting path R for transporting a body by means of a conveyer. A first conveyer included in the transporting path R is a roller conveyer 1 which is overlapped by a part of an end of a shuttle conveyer which acts as a second conveyer constituting an exchange portion.

Figure 3:
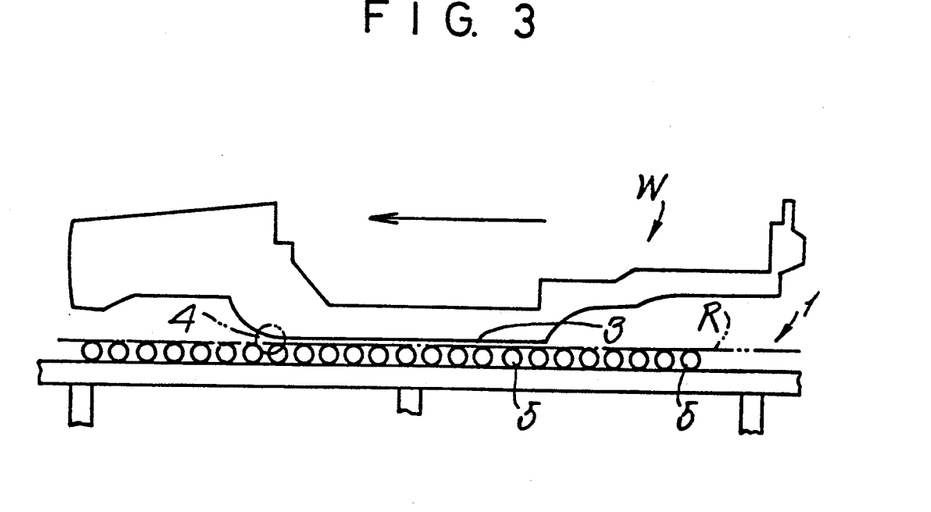
FIG. 3 is a schematic side view of a car body transported to the device for positioning the body illustrated in FIG. 1.
Figure 4:
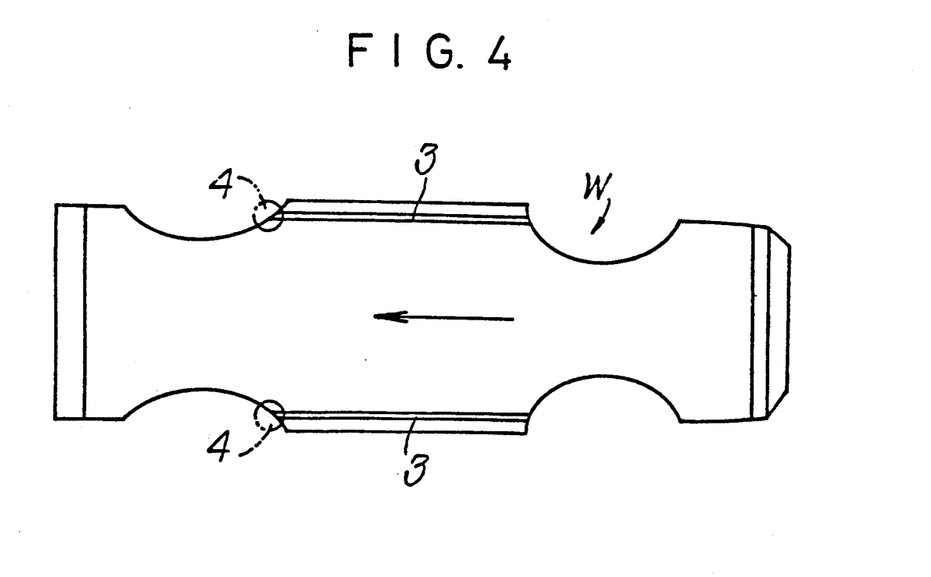
FIG. 4 is a schematic plan view of a car body transported to the device for positioning the body illustrated in FIG. 1.

Transported to the transporting path R of the roller conveyer 1 is a body which has already been processed at a previous station, in particular, a body W where vertical projecting walls 3 extending along the longitudinal direction Y of the body and tip reference portions 4 have already been formed as illustrated in FIGS. 3 and 4. The vertical projecting walls 3 formed on a lower part of the body extending along the longitudinal direction Y of the body are used for the lateral position X of the body, while the tip reference portions 4 are used for the longitudinal positioning of the body.

Figure 2:
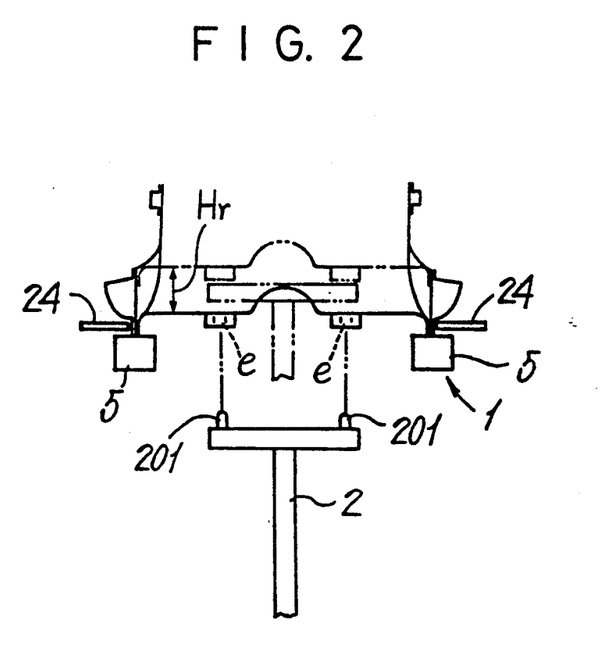
FIG. 2 is a schematic view for use in describing operation of a shuttle conveyer connected to the device for positioning the body illustrated in FIG. 1.

In the course of the assembly cycle, the body W positioned on the roller conveyer 1 is transported to a subsequent welding station M by means of the shuttle conveyer (see FIG. 2) and is set at a predetermined welding position.

As shown in FIG. 1, the roller conveyer 1 comprises a plurality of metal rollers 5 disposed in sequence at the upper portion of base members 6 (see FIGS. 9 and 10) on the right and left sides of the transporting path, thereby forming the plan transporting path R. Each roller is driven through a rotary transmission (not shown) which is driven by a transportation motor 7. In addition, the roller conveyer 1 enables the relatively slidable transport of the body W at a predetermined time in the longitudinal direction Y or the lateral direction X. The transportation motor 7 is drivingly controlled by a roller controlling arrangement 8.

The main portion of the roller controlling arrangement 8 is implemented by a microcomputer. On reception of a drive command to transport the body W in the transporting direction, the controlling arrangement can rotate all of the rollers 5 at the same speed in response to this command. The controlling arrangement is connected to a shift controlling arrangement 23 which will be described below so as to secure communication therewith.

On the side of the roller conveyer 1, a lateral positioning arrangement 9 is disposed, while a longitudinal positioning arrangement 10 is disposed on the advancing end thereof.

Figure 6:
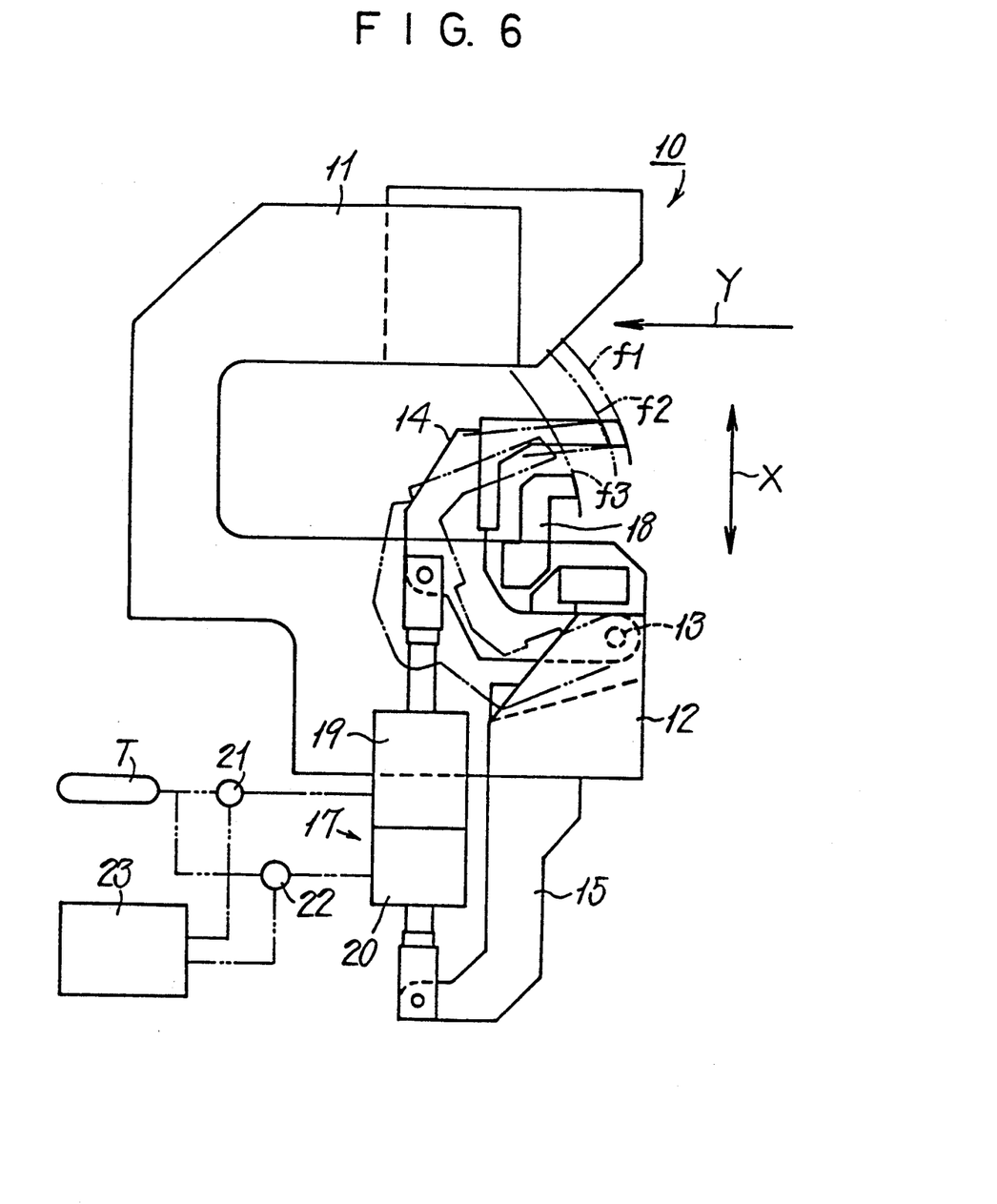
FIG. 6 is a plan view of a longitudinal positioning arrangement for use in the device for positioning the body illustrated in FIG. 1.
Figure 7:
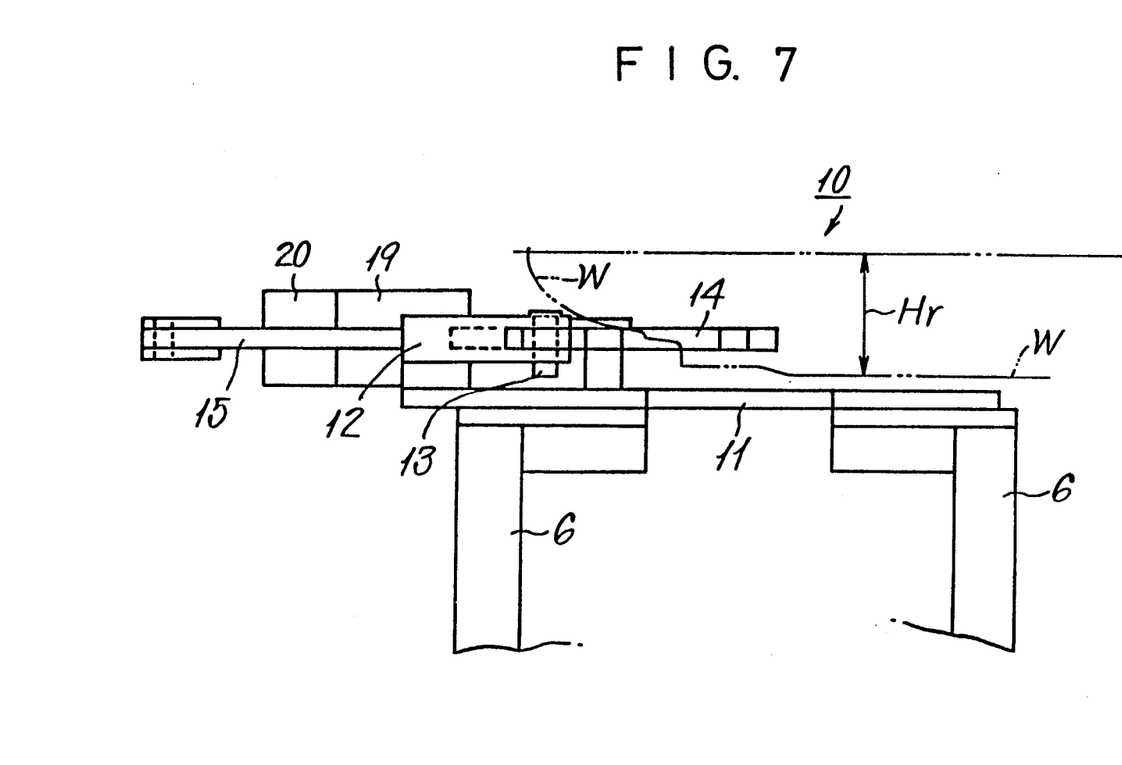
FIG. 7 is a side view of a longitudinal positioning arrangement for use in the device for positioning the body illustrated in FIG. 1.

The longitudinal positioning arrangement 10 consists of, as illustrated in FIGS. 1, 6 and 7, an advancing end bracket 11 secured on the base member 6, a U-shaped bracket 12 having a U-shaped section which is integrally connected to the bracket 11, a vertical pin 13 which is integrally connected to the U-shaped bracket 12, a hook-like advancing end positioning member 14 pivotally supported by the vertical pin 13, an arm 15 extending from the end of the U-shaped bracket 12, and an air cylinder unit 17. The one end of the air cylinder unit is connected through pins to the arm 15 and the other end thereof is connected to a back surface of the advancing end positioning member 14. A reference numeral 18 represents a third advancing end position restricting piece which will be described below.

The air cylinder unit 17 is formed by integrally connecting in series each cylinder bottom wall of a pair of first and a second front cylinder 19 and 20 in mutual contact, whereby the entire arrangement becomes small and compact. Each of the cylinders 19 and 20 is connected to high-pressure air supply T through directional control valves 21 and 22. The first and the second directional control valves 21 and 22 are connected to the shift controlling arrangement 23. The longitudinal positioning arrangement 10 selectively controls the two directional control valves 21 and 22 to rotate the single advancing end positioning member 14. The advancing end positioning member 14 is supported so that the engaging position thereof can be shifted. The first, the second and the third advancing end positions f1, f2 and f3 as three longitudinal predetermined positions are selectively shifted by means of the tip of the advancing end positioning member in contact with the tip reference portion 4 of the body W. More particularly, when the shift controlling arrangement 23 turns on the first and the second directional control valves 21 and 22 at a predetermined time instant, the advancing end positioning member 14 enables the setting of the first advancing end position f1. When the first directional control valve 21 is turned on and the second front directional control valve 22 is turned off, the second advancing end position f2 can be set. With the first and the second front directional control valves 21 and 22 inactivated, the advancing end positioning member is retracted to a position indicated by a dotted line in FIG. 6 and the third advancing end position f3 can be set by using the third advancing end position restricting piece 18. The third advancing end position f3 may be determined by turning off the first directional control valve 21 and turning on the second front directional control valve 22 without using the third advancing end position restricting piece 18. It may be also possible to set the third advancing end position f3 at the same position as the retracted position of the advancing end positioning member 14.

Figure 9:
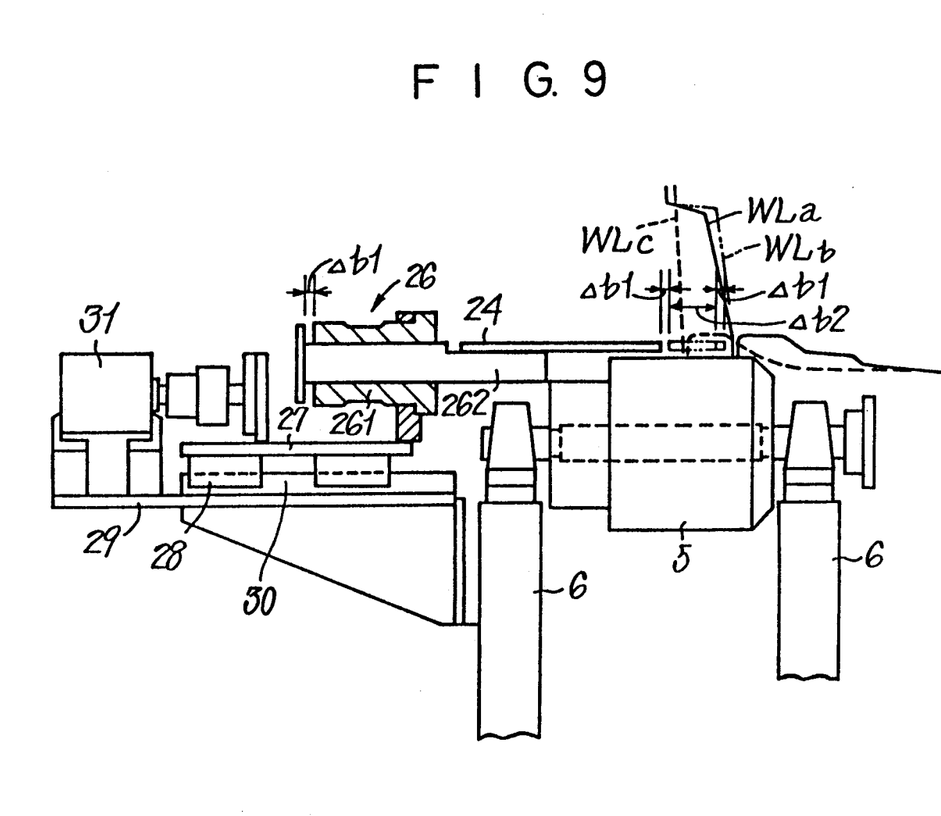
FIG. 9 is a partially cutaway side sectional view of a lateral positioning arrangement for use in the body positioning device illustrated in FIG. 1.
Figure 10:
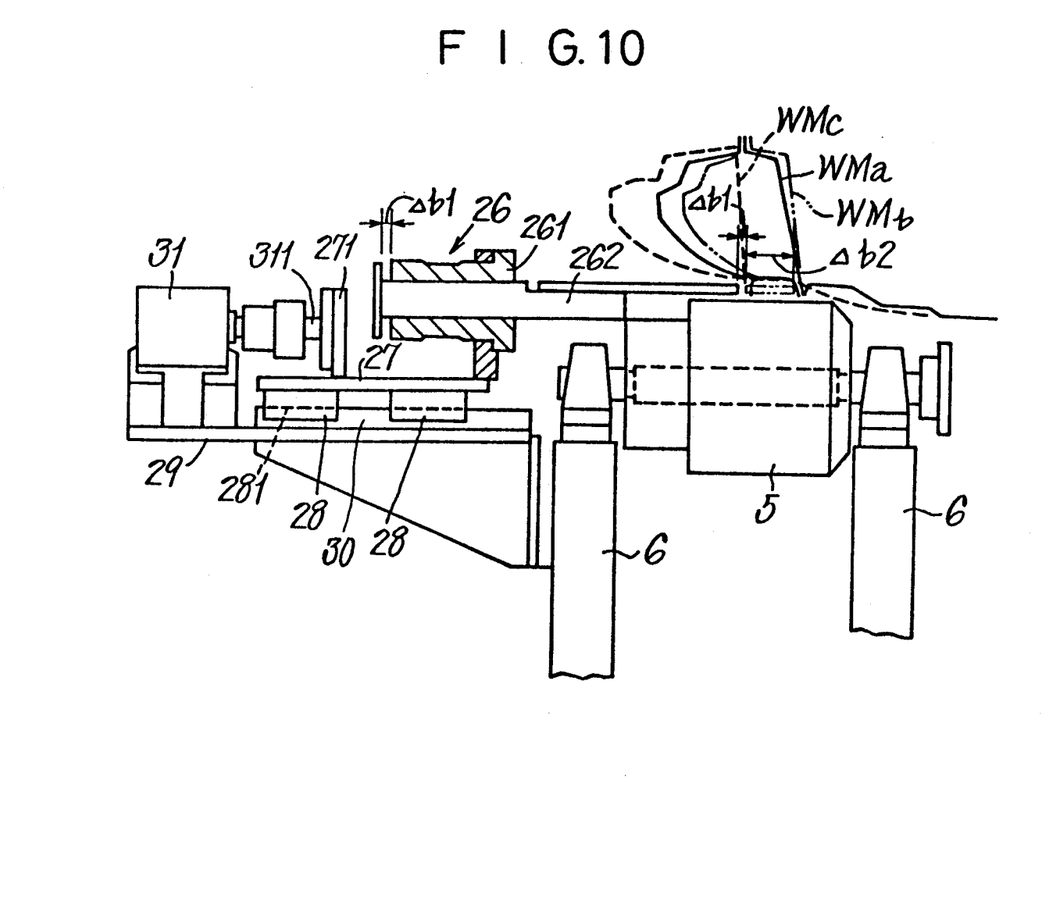
FIG. 10 is a partially cutaway side sectional view of a lateral positioning arrangement for use in the device for positioning the body illustrated in FIG. 1 according to another embodiment of the present invention.

The lateral positioning arrangement 9 is constructed with lateral position restricting plates 24 arranged on each side of the transporting path R, each plate 24 being supported above each pair of rollers supported at an upper portion of each base member 6, as illustrated in FIGS. 1, 9 and 10. Each of these lateral position restricting plates is driven by the respective lateral restricting plate driving mechanism 25. All of the lateral restricting plate driving mechanisms are implemented in the same manner.

Figure 8:
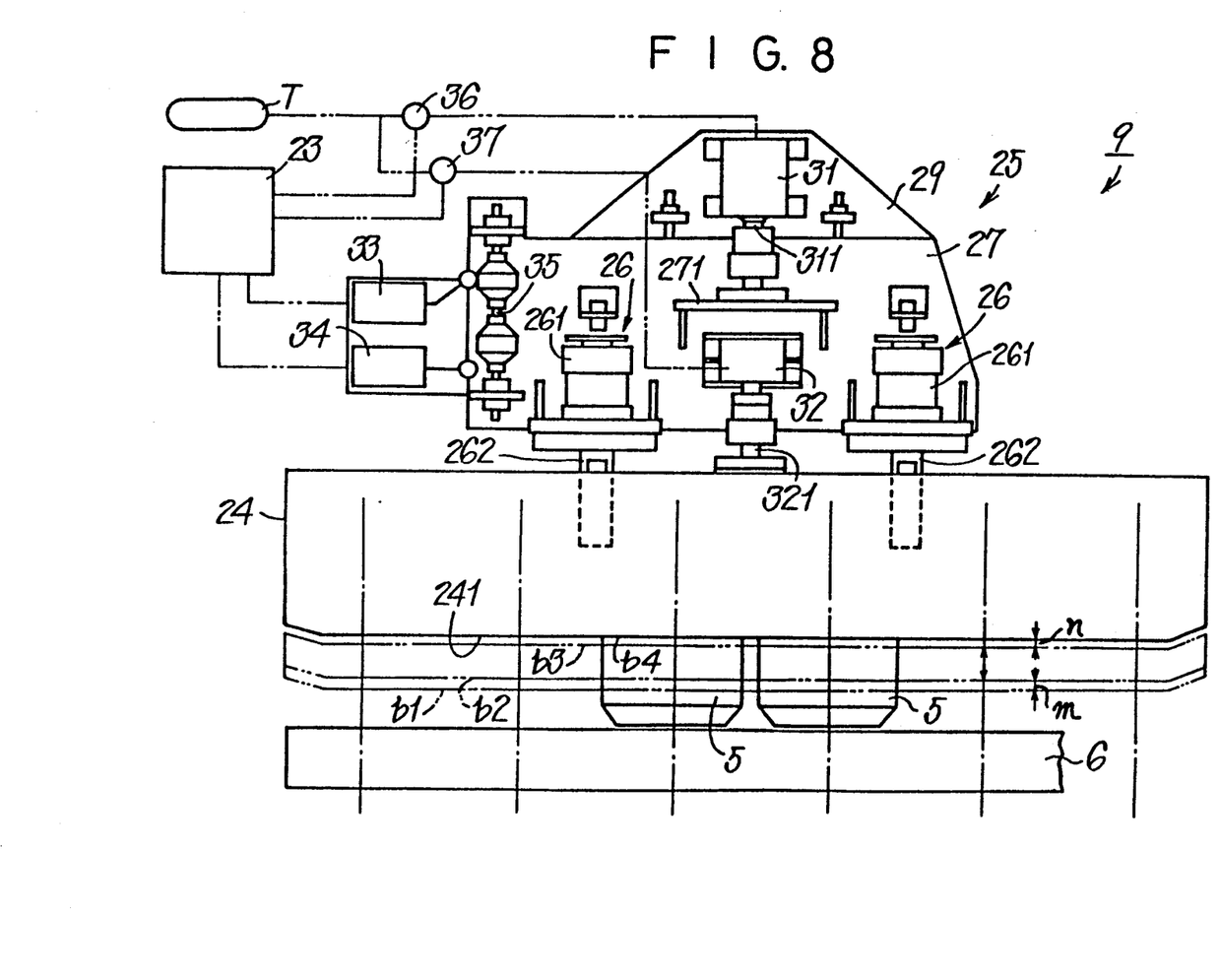
FIG. 8 is a plan view of a lateral positioning arrangement for use in the device for positioning the body illustrated in FIG. 1.
Figure 11:
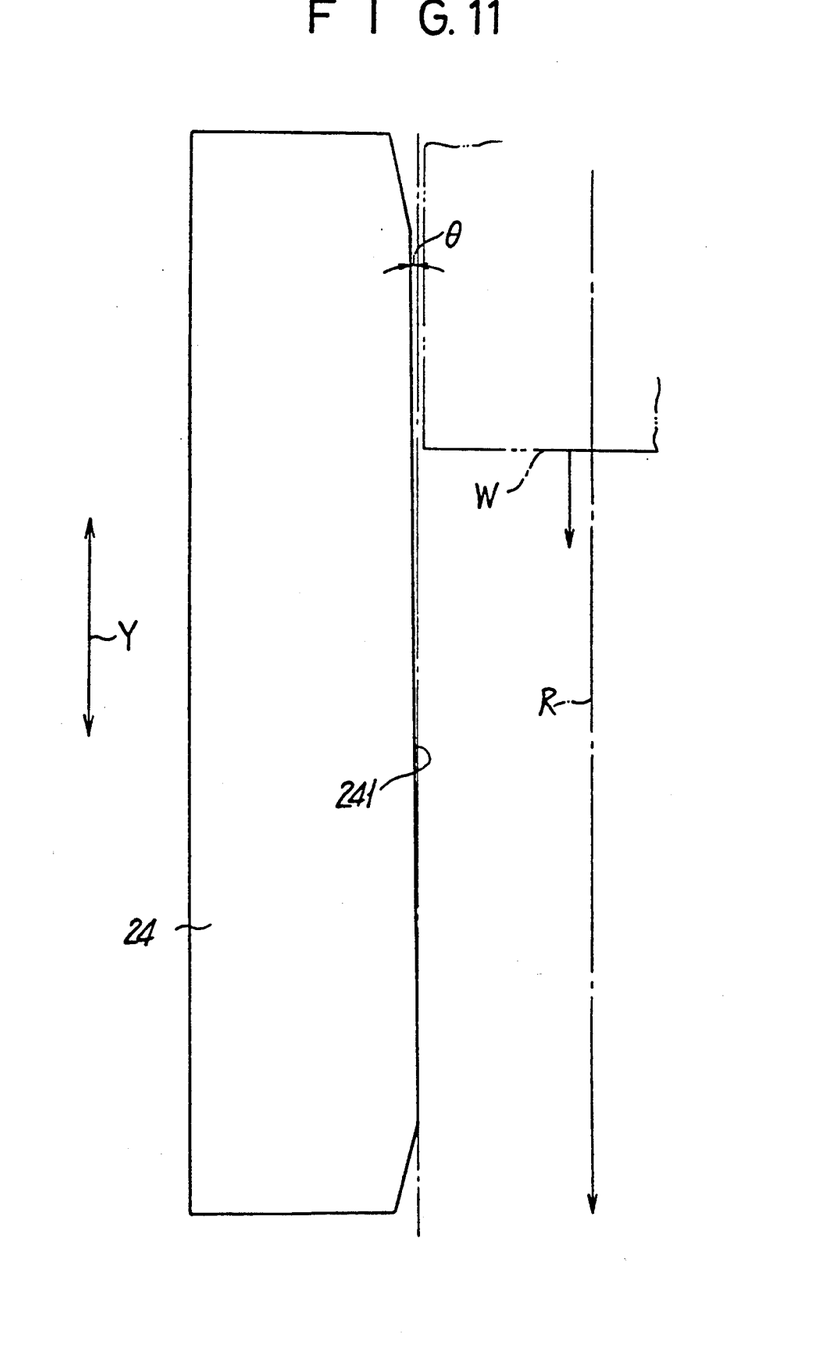
FIG. 11 is an expanded plan view of a lateral position restricting plate in the lateral positioning arrangement for use in the device for positioning the body illustrated in FIG. 1.

As illustrated in FIG. 8, each of the lateral position restricting plates 24 is a long plate member provided with a straight slide contact end 241 which is slidably in contact with the vertical projecting wall 3 extending along the longitudinal direction Y on the lower portion of the body on the transporting path R. The lateral restricting plate driving mechanism 25 for use in supporting the lateral position restricting plate is supported by a crosswise bracket 29 which is integrally connected to the side wall of the base member 6. As shown in FIG. 11, the lateral position restricting plate 24 is constructed in such a manner that the straight slide contact end 241 extending along the longitudinal direction Y is inclined in the front direction at an angle $\theta$ and the amount of position restriction in by the slide contact end 241 is increased as the body W advances. More particularly, the straight slide contact end 241 is constructed so that the projection amount of thereof towards the centerline of the transporting path R is increased along the advancing direction of the transported body W. As a result, each of the vertical projecting walls 3 approaches the centerline of the transporting path R by an equal amount on both sides. In this event, it is possible to gradually increase the position restriction amount in the transversal direction according to the advancing amount of the body W. This results in smooth lateral position restriction. However, in some cases, both end portions of each slide contact end 241 may be simply cutaway by a predetermined amount.

As shown in FIG. 9, on the crosswise bracket 29, the lateral position restricting plate 24 is supported so that the engaging position thereof can be shifted. The lateral position restricting plate 24 is selectively operated by a second cylinder 32 through a cylinder 31 and a slide table 27 which is selectively operated thereby. More particularly, on the right and left sides of the crosswise bracket 29, a pair of rails 30 is integrally disposed in the crosswise direction to cross the transporting path R at right angle. The slide table 27 is supported on the pair of rails 30. The slide table has guide pieces 28 (see FIG. 10) in which a concave groove 281 is formed on the lower surface thereof to slidably contact the rail 30. Two guide pieces are disposed on each of the right and left sides. On the end of the crosswise bracket 29, the first crosswise cylinder 31 is disposed and a shaft 311 thereof is connected to a projecting piece 271 which is integrally formed with the slide table 27. On the slide table 27, a pair of slide shifters 26, 26 is attached at the right and left side thereof. Each slide shifter 26 comprises a hollow cylindrical portion 261 integrally connected to the slide table 27. One end of a shaft 262 inserted into a sliding hole at the center thereof is integrally connected to the lateral position restricting plate 24. In addition, the second crosswise cylinder 32 is attached to the center of the slide table and a shaft 321 thereof is also integrally connected to the lateral position restricting plate 24.

A pair of limit switches 33 and 34 is provided with the side ends of the crosswise bracket 29 and a shift operating member 35 integrally supported on the slide table 27 at the corresponding position thereto. Accordingly, the pair of limit switches 33 and 34 can supply detection signals to the shift controlling arrangement 23 for the lateral positions b1, b2, b3 and b4 as the four lateral predetermined positions described below depending on four different combinations of ON and OFF.

The first crosswise cylinder 31 and the second crosswise cylinder 32 are connected to the high-pressure air supply T through crosswise directional control valves 36 and 37. Four of such first and second crosswise directional control valves 36 and 37 of each lateral restricting plate driving mechanism 25 are disposed by four for each lateral positioning arrangement 9. These control valves 36 and 37 are connected to the shift controlling arrangement 23 and are controlled in the same manner.

More particularly, when the shift controlling arrangement 23 turns on the first and the second crosswise directional control valves 36 and 37 at a predetermined time instance, the lateral position restricting plate 24 enables the setting of the first lateral position b1 as illustrated in FIG. 9. When the first crosswise directional control valve 36 is turned on and the second crosswise directional control valve 37 is turned off, the second crosswise position b2 can be set at a position drawn by Δb1 (determined in accordance with m and n in FIG. 5) from b1. When the first crosswise directional control valve 36 is turned off and the second crosswise directional control valve 37 is turned on, the third crosswise position b3 can be set at a position drawn by Δb2 from the second crosswise position b2. With the first and the second crosswise directional control valves 36 and 37 inactivated, the fourth crosswise position b4 can be set at a position further retracted by Δb1 from the third crosswise position b3.

A main portion of the shift controlling arrangement 23 is implemented by a microcomputer and is connected to a host computer in an assembly line for the body. The shift controlling arrangement carries out control processing for position restriction in response to signals such as a signal indicative of a car type of the body W, an operation instruction, a signal and a transporting timing signal or the like.

Figure 5:
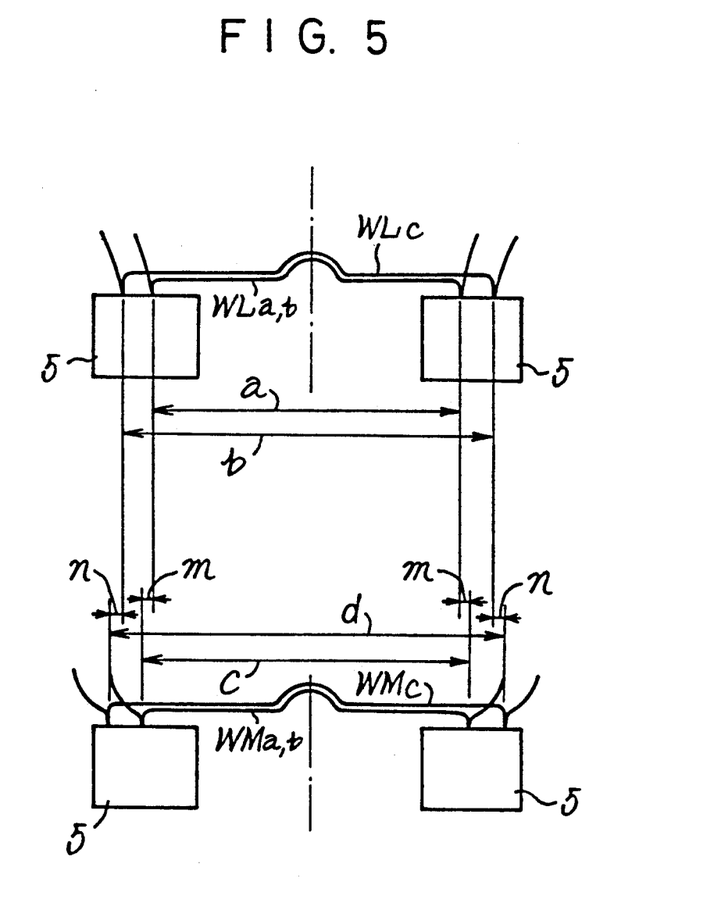
FIG. 5 is a view comparing sectional dimensions of different car bodies transported on a roller conveyer of the device for positioning the body illustrated in FIG. 1.

As illustrated in FIGS. 1 and 5, underbodies WLa and WLb of a car A and a car B which are equal in width a, an underbody WLc of a car C having relatively large width b, main bodies WMa and WMb of the cars A and B which are equal in width c, and a main body WMc of the car C having relatively large width d are transported to the transporting path R. The main bodies WMa and WMb of the cars A and B are larger than the underbodies WLa and WLb thereof by an amount m. Similarly, the main body WMc of the car C is larger than the underbody WLc thereof by an amount n. Further, the predetermined positions f1, f2 and f3 along the advancing direction Y are determined for these cars A, B and C in this order. In other words, the device for positioning the body on this transporting path must shift among four lateral predetermined positions b1, b2, b3 and b4 and must shift among three longitudinal predetermined positions f1, f2 and f3.

A method for positioning the body by using the device for positioning the body illustrated in FIGS. 1 through 11 in conjunction with operation of the device for positioning the body will now be described.

When the underbody WLa of the car A is transported to the transporting path R after completion of previous processing, the shift controlling arrangement 23 detects this to activate the roller conveyer 1 and receives a signal indicating the type of body W from a host computer which is not shown before the body W arrives at the transfer position (a region covered by the longitudinal positioning arrangement 10 and the lateral positioning arrangement 9 illustrated in FIG. 1). It is assumed that a signal indicative of the car A is provided then, the device 23 judges the stored car type signal, i.e., the car A in this embodiment, and turns on the first and the second crosswise directional control valve 36 and 37 in response thereto to shift the lateral position restricting plate 24 at the first crosswise position b1 (see FIGS. 8 and 9). Simultaneously, it turns on the first and the second front directional control valves 21 and 22 to shift the advancing end positioning member 14 at the first advancing end position f1 (see FIG. 6). As a result, the vertical projecting wall 3 slidably contacts the slide contacting end 241 of the lateral position restricting plate 24 and the vertical projecting walls 3 on the right and left sides center on the centerline of the transporting path R by an equal amount as the underbody WLa of the car A advances on the roller conveyer 1. Accordingly, the amount of position restriction in the crosswise direction is increased in accordance with the advancing amount of the body W to be restricted at the first crosswise position b1. Simultaneously, the tip reference portion 4 of the body contacts the advancing end positioning member 14, whereby the position of the body is restricted at the first advancing end position f1. Thus, the movement in the advancing direction is interrupted.

Thereafter, when the shift controlling arrangement 23 detects the completion of the positioning by means of a limit switch (not shown), the roller is stopped and a drive permission command for the shuttle conveyer 2 is supplied to the host computer. Then, the shuttle conveyer 2 inserts a projection 201 disposed on the upper surface of the shuttle into a predetermined engaging hole e (see FIG. 2) on the lower wall of the underbody WLa of the car A positioned on the roller conveyer 1 to lift up the body by an amount Hr. The shuttle is then rapidly transported by one transporting distance before being lowered. The lowered shuttle is transported in a returning direction with no parts thereon. As the shuttle is lowered, the engaging hole e of the body is engaged with an engaging member (not shown) for use in restricting the position of a subsequent welding operation. Accordingly, the subsequent positioning can be readily carried out.

In the same manner, when the subsequent body W is transported to the transporting path R after completion of the previous process, the shift controlling arrangement 23 detects this to again activate the roller conveyer 1 and receives a signal indicating the type of the body W, i.e., the car B in this embodiment, before the body W arrives at the transfer position. Further the shift controlling arrangement 23 switches the lateral position restricting plate 24 at the first crosswise position b1 (see FIGS. 8 and 9). Simultaneously, the device 23 turns on the first front directional control valve 21 and turns off the second front directional control valve 22 to shift the advancing end positioning member 14 to the second advancing end position f2 (see FIG. 6). Accordingly, the position processing of the underbody WLb of the car B is carried out by transporting the body WLb to the transfer position as described above. Then, the underbody WLb of the car B is transported to the subsequent welding position by the shuttle conveyer 2.

Similarly, when the underbody WLc of the car C is transported to the transporting path R after completion of a previous process, the shift controlling arrangement turns off the first crosswise directional control valve 36 and turns on the second crosswise directional control valve 37 to shift the lateral position restricting plate 24 to the third crosswise position b3 (see FIGS. 8 and 9). Simultaneously, the device turns off both the first and second front directional control valves 21 and 22 to shift the advancing end positioning member 14 to the third advancing end position f3 (see FIG. 6). Accordingly, the position processing of the underbody WLc of the car C is carried out in the same manner and the underbody WLc of the car C is transported to the subsequent welding position by the shuttle conveyer 2.

Similarly, when the main body WMa of the car A is transported to the transporting path R after completion of a previous process, the shift controlling arrangement turns on the first crosswise directional control valve 36 and turns off the second crosswise directional control valve 37 to shift the lateral position restricting plate 24 to the second crosswise position b2 (see FIGS. 8 and 10). Simultaneously, the device turns on both the first and the second front directional control valves 21 and 22 to shift the advancing end positioning member 14 to the first advancing end position f1 (see FIG. 6). Accordingly, the main body WMa of the car A is transported to the subsequent welding position by the shuttle conveyer 2 in the same manner as described above.

Similarly, when the main body WMb of the car B is transported to the transporting path R after completion of a previous process, the shift controlling arrangement turns on the first crosswise directional control valve 36 and turns off the second crosswise directional control valve 37 to shift the lateral position restricting plate 24 to the second crosswise position b2 (see FIGS. 8 and 10). Simultaneously, the device turns on the first front directional control valve 21 and turns off the second front directional control valve and 22 to shift the advancing end positioning member 14 to the first advancing end position f2 (see FIG. 6). Thus, the main body WMb of the car B is transported to the subsequent welding position by the shuttle conveyer 2 in the same manner as described above.

Similarly, when the main body WMc of the car C is transported to the transporting path R after completion of a previous process, the shift controllin arrangement turns off both the first and second crosswise directional control valves 36 and 37 to shift the lateral position restricting plate 24 at the fourth crosswise position b4 (see FIGS. 8 and 10). Simultaneously, the device turns off both of the first and the second front directional control valves 21 and 22 to shift the advancing end positioning restricting piece 18 to the third advancing end position f3 (see FIG. 6). Thus, the main body WMb of the car B is transported to the subsequent welding position by the shuttle conveyer 2 in the same manner as described above.

As mentioned above, according to the method for positioning the body by using the device for positioning the body illustrated in FIG. 1, the advancing end positioning member 14 and the lateral position restricting plate 24 are selectively changed and held at one of the advancing end position f1, f2 and f3 or the first, the second, the third and the fourth lateral positions b1, b2, b3 and b4 depending on the type of each car prior to the arrival of the body W at the transfer position. Accordingly, the advancing end positioning member 14 and the lateral position restricting plate 24 are in contact with the tip reference portion 4 of the body, or the lateral positioning member is in contact with the vertical projecting wall 3. As a result, each body is positively positioned at a predetermined position depending on the type of the body.

In particular, the single advancing end positioning member 14 and the single lateral position restricting plate 24 are selectively held at the longitudinal predetermined position or the lateral predetermined position before the body is arrives at the transfer position. Thus, the shifting operation can be positively carried out by using the device which is not complicated.

On the other hand, in the device for positioning the body illustrated in FIG. 1, the shift controlling arrangement 23 selects one of the advancing end positions f1, f2 and f3 or the first, the second, the third and the fourth lateral positions b1, b2, b3 and b4 depending on the type of car. The shift controlling arrangement 23 produces the shift signal in order to shift the advancing end positioning member 14 to the selected advancing end position or produces the shift signal in order to shift the lateral position restricting plate 24 to the selected lateral predetermined position. Therefore, the proper positioning of the body at a plurality of predetermined positions can be selectively carried out by using the single advancing end positioning member 14 and the single lateral position restricting plate 24. The shifting operation thereof can be positively carried out. Therefore, a simple device can be applied.

In the above mentioned embodiment, the body on the transporting path has been described as the main body or the underbody in the course of the welding process. However, the present invention can also be equally applied as a method and a device for positioning the body in another manufacturing process of the body.

Further, in the above mentioned embodiment, one exemplified case where the body on the transporting path is positioned in the longitudinal direction Y and the lateral direction X at the same time. However, the front-to-back position of the body may be selectively determined by shifting among three longitudinal positions f1, f2 and f3 with a fixed lateral direction. On the other hand, the lateral position of the body may be selectively determined by shifting among four lateral positions b1, b2, b3 and b4 with a fixed longitudinal direction. Further, although the present invention has been described in conjunction with the body on the transporting path in the course of an assembly cycle prior to the welding process, the present invention is equally applicable to a device for positioning the body of each member. Furthermore, the above mentioned cylinder unit comprises two cylinders connected in series. However, it is also possible to connect three or more cylinders to determine four or more longitudinal predetermined position.

INDUSTRIAL APPLICATION FIELD

As mentioned above, the method and the device for positioning the body according to the present invention can be effectively used by being arranged in the body manufacturing line in a car factory. In particular, the device is simplified so that it is readily attached to the transfer position disposed on the end of each conveyer. Further, it is possible to transport the body positioned at high accuracy to a stop arrangement of the conveyer. The effect by which the conveyer can smoothly and surely transfer the body is well obtained.

We claim:

1. A method for positioning a body using a device for positioning the body which is arranged on a transporting path wherein the body transported on a first conveyer is transferred to a second conveyer at a transfer position and which comprises a longitudinal positioning member selectively held with an engaging point which is variable at one of a plurality of longitudinal predetermined positions on said transfer position, in which said body is positioned at one of said plurality of longitudinal predetermined positions on said transfer position by means of said longitudinal positioning member in contact with a tip reference portion of said body and a lateral positioning member selectively held with an engaging point which is variable at one of a plurality of lateral predetermined positions on said transfer position, in which said body is positioned at one of said plurality of lateral predetermined positions on said transfer position by means of said lateral positioning member in contact with a vertical projecting wall extending along the longitudinal direction of said body, said longitudinal positioning member is selectively moved and held at one of said plurality of longitudinal predetermined positions, depending on the type of said body, prior to arrival of said body at said transfer position, and said lateral positioning member is selectively moved and held at one of said plurality of lateral predetermined positions, depending on the type of said body, prior to arrival of said body at said transfer position.

2. A device for positioning a body having a tip reference portion formed at a lower portion of the body for use in longitudinal positioning, wherein said device comprises a conveyer for transporting said body along a transporting path, longitudinal positioning means supported on a base portion along said transporting path for selectively holding said body with an engaging point, said engaging point being variable at a longitudinal predetermined position, depending on the type of body, in contact with said tip reference portion, and control means for supplying a shift signal to said longitudinal positioning means on setting thereof, wherein said longitudinal positioning means comprises a longitudinal positioning member which is rotated around a vertical pin supported on said base portion along said transporting path, and a cylinder unit of which the two ends are connected through pins to said base portion and said longitudinal positioning member, respectively, and which includes at least two cylinders connected in series, and said control means controls said longitudinal positioning member contact with said tip reference portion by adjusting supply and discharge amounts of high-pressure fluid in said cylinder unit to selectively position said body at one of a plurality of said longitudinal predetermined positions.

3. The device as claimed in claim 2, wherein said control means controls said longitudinal positioning member in contact with said tip reference portion by adjusting supply and discharge amounts of high-pressure fluid in said cylinder unit to selectively position said body at one of at least three longitudinal predetermined positions.

4. A device for positioning a body having a vertical projecting wall extending in a longitudinal direction of the body and being formed at a lower portion of the body for use in lateral positioning, wherein said device comprises a conveyer for transporting said body along a transporting path, lateral positioning means having a lateral position restricting plate supported on a base portion along said transporting path for selectively holding said body with an engaging point which is variable at a lateral predetermined position, depending on the type of the body, and being slidably in contact with said vertical projecting wall of the body, and control means for supplying a shift signal to said lateral positioning means on setting thereof, wherein said lateral positioning means further includes a first cylinder, a second cylinder, and a slide table, said lateral position restricting plate being selectively operated by said second cylinder through said first cylinder and said slide table selectively operated thereby.

5. The device as claimed in claim 4, wherein said lateral positioning means further includes a first cylinder, a second cylinder, and a slide table, said lateral position restricting plate being selectively operated by said second cylinder through said first cylinder and said slide table selectively operated thereby and said lateral predetermined position for the body is selectively held at four positions on each of the right and left sides.

6. The device as claimed in claim 4, wherein said lateral position restricting plate said side-to side positioning means is formed in such a manner includes a slide contacting edge which extends in a longitudinal direction in contact with said vertical projecting wall, said slide contacting edge having an inclined portion which contributes to increasing a position restricting amount as said body advances.

7. A device for positioning a body having a tip reference portion and a vertical projecting wall extending in the longitudinal direction of the body both of which are formed at a lower portion of the body for use in longitudinal and lateral positioning of said body, respectively, wherein said device comprises a conveyer for transporting said body along a transporting path, longitudinal positioning means supported on a base portion along said transporting path for selectively holding said body with a longitudinal positioning engaging point which is variable at a longitudinal predetermined position, depending on the type of the body, in contact with said tip reference portion of the body, lateral positioning means having a lateral position restricting plate supported on a base portion along said transporting path for selectively holding said body with a lateral positioning engaging point which is variable at a lateral predetermined position, depending on the type of the body, and being slidable in contact with said vertical projecting wall of the body, and control means for supplying a shift signal to said longitudinal positioning means on setting thereof.

8. The device as claimed in claim 7, wherein said longitudinal positioning means comprises a longitudinal positioning member which is rotated around a vertical pin supported on said base portion along said transporting path, and a cylinder unit of which the two ends are connected through pins to said base portion and said longitudinal positioning member, respectively, and which includes at least two cylinders connected in series, and said control means controls said longitudinal positioning member in contact with said tip reference portion by means of adjusting supply and discharge amounts of high-pressure fluid in said cylinder unit to selectively position said body at one of a plurality of said longitudinal predetermined positions.

9. The device as claimed in claim 8, wherein said control means controls said longitudinal positioning member in contact with said tip reference portion by means of adjusting supply and discharge amounts of high-pressure fluid in said cylinder unit to selectively position said body at one of at least three longitudinal predetermined positions.

10. The device as claimed in claim 7, wherein said lateral positioning means further includes a first cylinder, a second cylinder, and a slide table, said lateral position restricting plate being selectively operated by said second cylinder through said first cylinder and said slide table selectively operated thereby.

11. The device as claimed in claim 7, wherein said lateral positioning means further includes a first cylinder, a second cylinder, and a slide table, said lateral position restricting plate being selectively operated by said second cylinder through said first cylinder and said slide table selectively operated thereby and said lateral predetermined position for the body is selectively held at four positions on each of the right and left sides.

* * * * *